United States Patent
Antunes et al.

(10) Patent No.: US 7,520,455 B2
(45) Date of Patent: Apr. 21, 2009

(54) DEVICE FOR REUSE OF PLASTIC MATERIALS AND PAPER FIBERS REJECTED IN PREVIOUS RECYCLING

(76) Inventors: Ronilso José Antunes, Rua José Hauer, 377-D, Curitiba, Paraná 81580-330 (BR); Assem Omar Barakat, Rua José Hauer, 377-D, Curitiba, Paraná 81580-330 (BR)

( * ) Notice: Subject to any disclaimer, the term of this patent is extended or adjusted under 35 U.S.C. 154(b) by 532 days.

(21) Appl. No.: 11/415,201

(22) Filed: May 2, 2006

(65) Prior Publication Data

US 2008/0283642 A1 Nov. 20, 2008

(30) Foreign Application Priority Data

May 3, 2005 (BR) ................................. 8500808 U

(51) Int. Cl.
*B02C 19/00* (2006.01)
(52) U.S. Cl. ................. 241/81; 241/101.2; 241/285.1
(58) Field of Classification Search ................. 241/81, 241/285.1, 101.2, DIG. 38
See application file for complete search history.

(56) References Cited

U.S. PATENT DOCUMENTS 4,875,999 A * 10/1989 Haight ........................ 209/245
5,184,780 A * 2/1993 Wiens ........................... 241/19
5,695,133 A * 12/1997 Morse et al. ................... 241/42

* cited by examiner

*Primary Examiner*—Mark Rosenbaum
(74) *Attorney, Agent, or Firm*—Baker & Hostetler LLP

(57) ABSTRACT

A device reuses several plastic materials and paper fibers rejected in previous recycling performed by paper industries, by compacting the fragments of the plastic materials inside of a conventional container. The device uses three interlinked modules, comprised by a first module of a helical, higher, inclined and gyratory separator, with electric engine, having the separator in the lower inclined edge a duct of materials entrance and in the higher inclined edge a duct of entrance of water, with base of its inclined higher edge leading to a gutter, and with base of the inclined lower edge leading to a lower tank of decantation provided of ejector nozzles, having a higher inclined conveyor belt that connects the first module to the second module, which contains an electric operated mill and an electric operated spare mill, with a duct connected to a vertical centrifugal washing machine equipped with a discharge nozzle and a duct connected to a vertical centrifugal drying machine equipped with a discharge nozzle and a duct linked to an electric operated pneumatic transporter, which is interlinked through a duct to a higher depot with discharge valve, part of the third module of the device, said valve connected to an electric operated compacting machine.

1 Claim, 4 Drawing Sheets

DEVICE FOR REUSE OF PLASTIC MATERIALS AND PAPER FIBERS REJECTED IN PREVIOUS RECYCLING

CROSS-REFERENCE TO RELATED APPLICATIONS

This application claims priority to Brazilian Patent Application No. MU8500808-7 filed on May 3, 2005, entitled, DEVICE FOR REUSE OF PLASTIC MATERIALS AND PAPER FIBERS REJECTED IN PREVIOUS RECYCLING, the disclosure of the application is incorporated herein by reference in its entirety.

FIELD OF THE INVENTION

The present invention relates generally to a device which has the purpose of reusing various plastic materials and paper fibers that were rejected in conventional recycling performed by paper industries.

BACKGROUND OF THE INVENTION

According to the technicians' understanding, specialized in the subject, currently the paper industries perform recycle of great amounts of after-consumption paper generated by the population, observing that, in Brazil, it is estimated a monthly recycle of more than 550,000 tons of such rejects, that after being discarded by the population, initially go through a collection and although considered as selective, presents an efficiency of approximately 80%. According to the technicians' understanding, specialized in the subject, it is foreseen that to each ton of after-consumption collected paper 200 kilos of several undesirable materials are obtained, among plastics that due to its diversity, vary in compositions and tenors. In this miscellany are notably found PE, PP, PVC, PET, ABS, PA, and other plastic types in smaller volumes. During the paper recycling, such undesirable materials represent loss of productivity, being rejected and consequently becoming environmental waste.

It must be noticed that environmental waste is garbage or material that does not go through any recycling process, which accumulated without a destination and causes possible damages to the environment.

All this undesirable material becomes a problem for paper industries that only use the paper from the recycling.

In the specific case of plastic materials, they can not be recycled by current techniques due to its heterogeneous composition, observing that each thermoplastic group has its own rheologic aspect, having singular process parameters, such as fluidity index, softening temperature, crystallization temperature and others. Thus, by the own characteristic of each thermoplastic group it is impossible the agglutination, extrusion, injection, blow or any other well-known process, due to the simultaneous presence of several thermoplastics groups.

Currently, paper industries, in the operation of paper recycling, come across with the problem of the existence of plastic materials in the volume under recycling, being observed the inefficiencies aforementioned which means loss of approximately 20% of the volume put in recycling and consequently becoming environmental waste. That occurs under automation technical conditions, being elementarily used in operations of paper recycling a big-sized hydraulic device, equipped with a rotor responsible for the dissolution of the papers into fibers. However, at the moment of the dissolution of the papers into fibers, said hydraulic device does not present enough technique to prepare the plastic material contained in the volume, aiming its later use. It must to be observed that along with the plastic material—totally unused—it follows in an agglomerate iron residue, used paper fibers that can reach a significant percentile of up to 50% of the plastic material weight, and also water that can reach a percentile of up to 30% of the agglomerate weight. Such agglomerate is discarded becoming an environmental waste.

It must be point out that the referred big-sized hydraulic device, equipped with a rotor, presents the most advanced technology in the international market, and even though it does not reach a percentile of 100% of reuse of said materials.

SUMMARY OF THE INVENTION

The device for reuse of plastic materials and paper fibers rejected in previous recycling, object of the present utility model patent, was idealize and conceived in secrecy in order to overcome the deficiencies mentioned on the technical state report, and said device forms a continuous production line, being essentially constituted by a first module equipped with a gyratory helical separator, that separates the volume of materials under reuse—material that come entangled in a net—iron, stone and other dense materials, that are lead to a conventional depot, while the plastic materials and paper fibers go to an inferior decantation tank, in which they are submitted to a hydraulic agitation that executes the decantation remaining the aforesaid materials in suspension and going through strong water jets expelled through nozzles arranged inside of the decantation tank, to an inclined conveyor belt, which connects the first module to a second module of the device, consequently leading the referred materials to an electric operated mill, that simultaneously triturates and washes the plastic materials and paper fibers, which are discharged by gravity into a vertical centrifugal washing machine where the water and paper fibers are extracted through a discharge nozzle, being pumped for the reuse by paper industry while the fragments of plastic materials pass to a vertical centrifugal drying machine, that sends them already dried to a pneumatic transporter interlinked to the third module of the device, leading the plastic materials fragments to a suspended depot equipped with discharge valve, which controls the flow of the aforesaid fragments to a compacting machine that compacts them inside a conventional container.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The present patent can be better understood observing the enclosed drawings and its comments, as follows:

DETAILED DESCRIPTION

Figure 1:
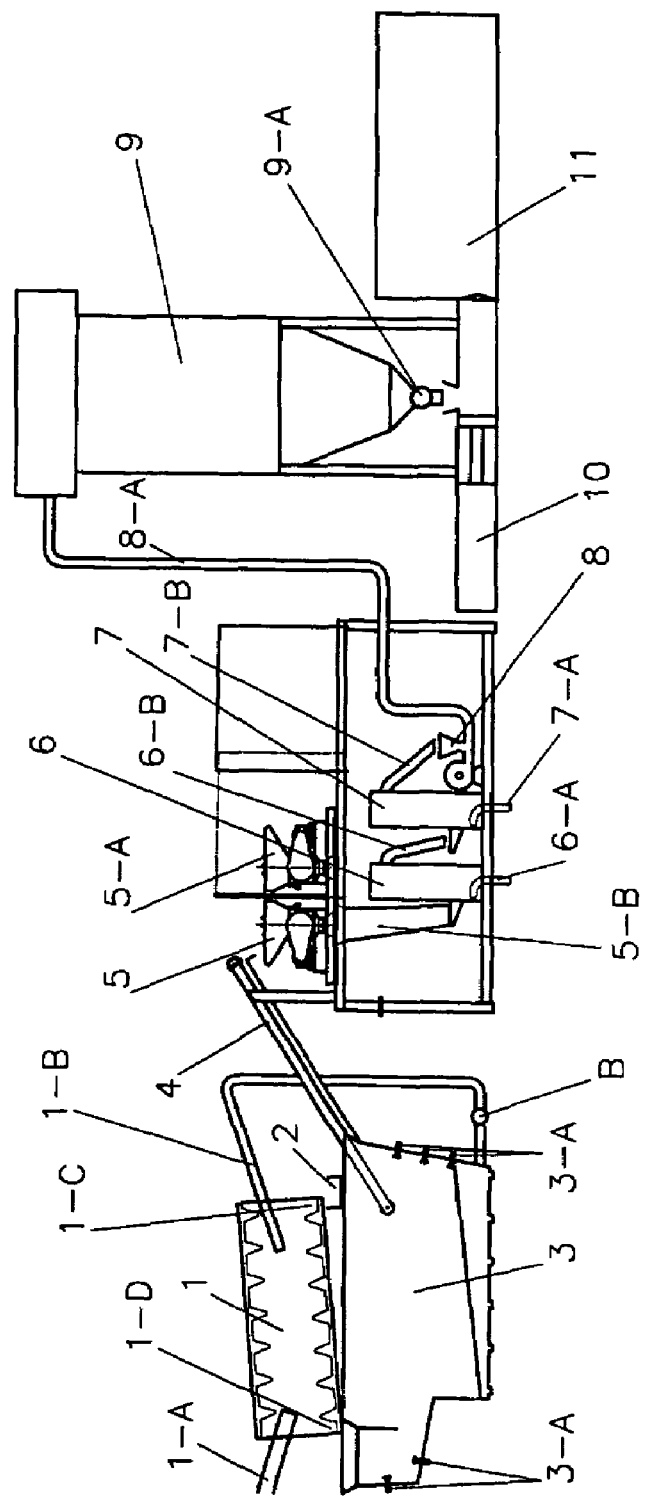
FIG. 1 shows in lateral and longitudinal view, with partial sections, the three modules that constitute the device, being evident on the illustration the continuous production line provided by the constructive dispositions, and the flow of the fragments is compacted inside the conventional container, also seen on the illustration.
Figure 2:
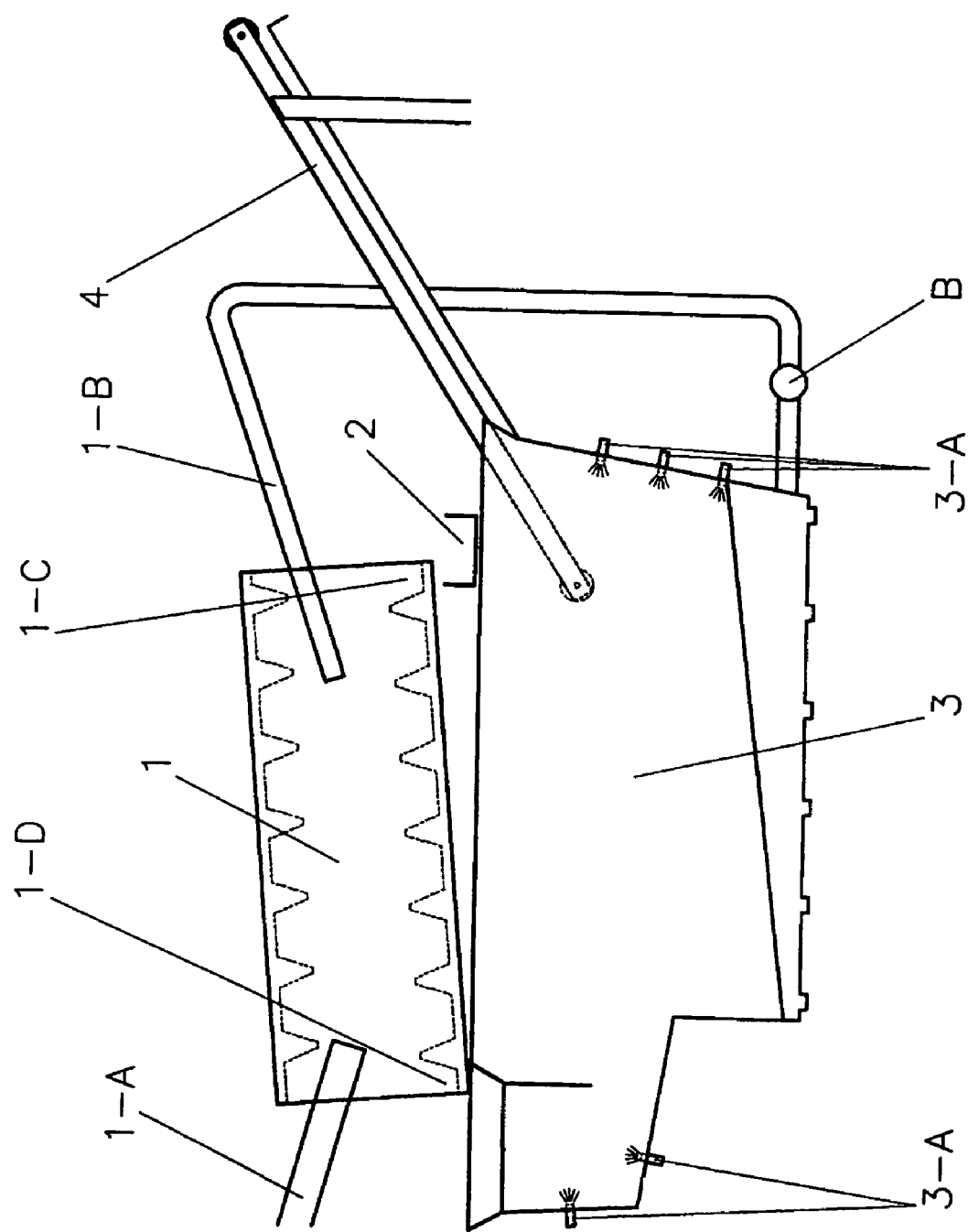
FIG. 2 shows in lateral view the first module of the device.
Figure 3:
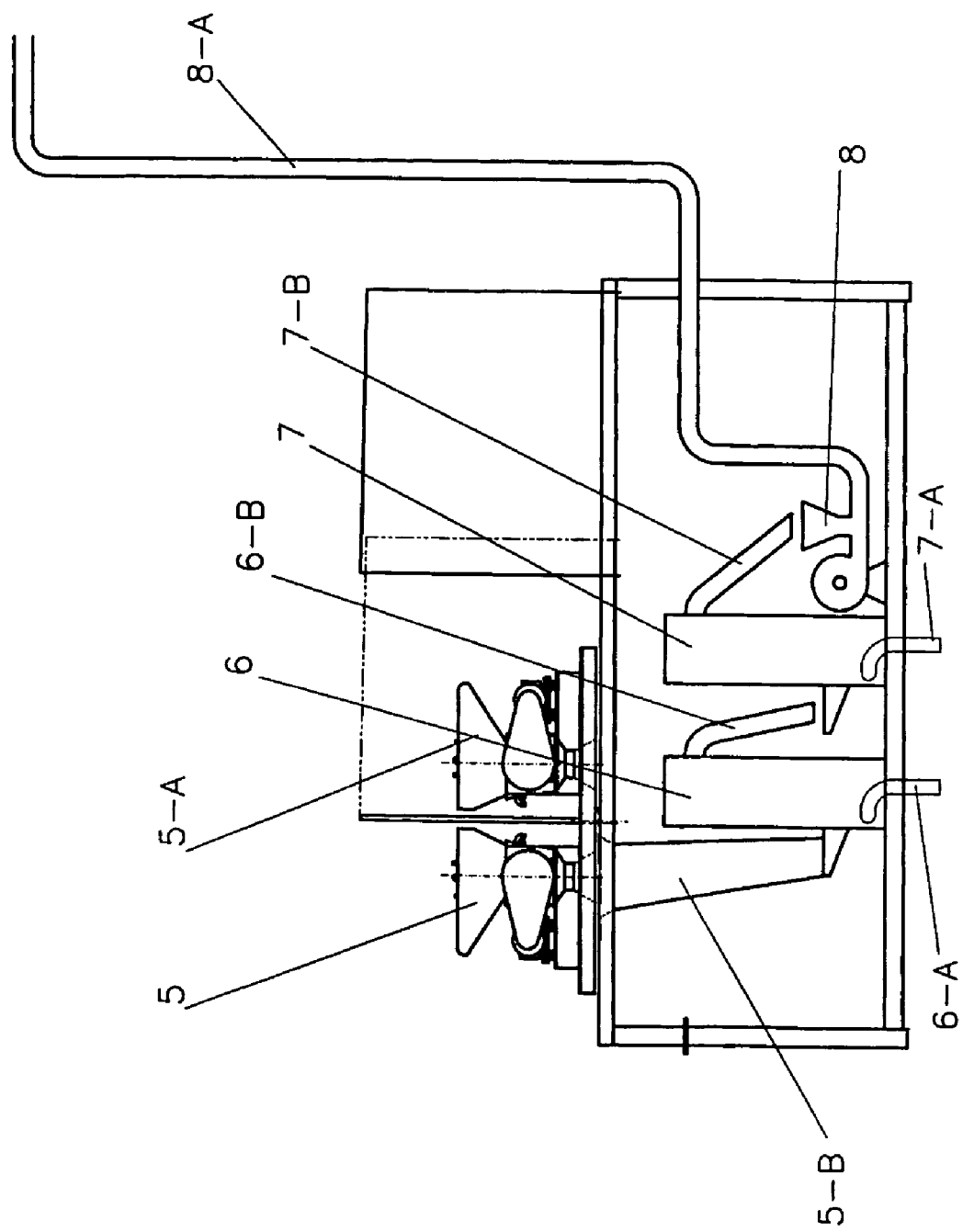
FIG. 3 shows in lateral view the second module of the device.
Figure 4:
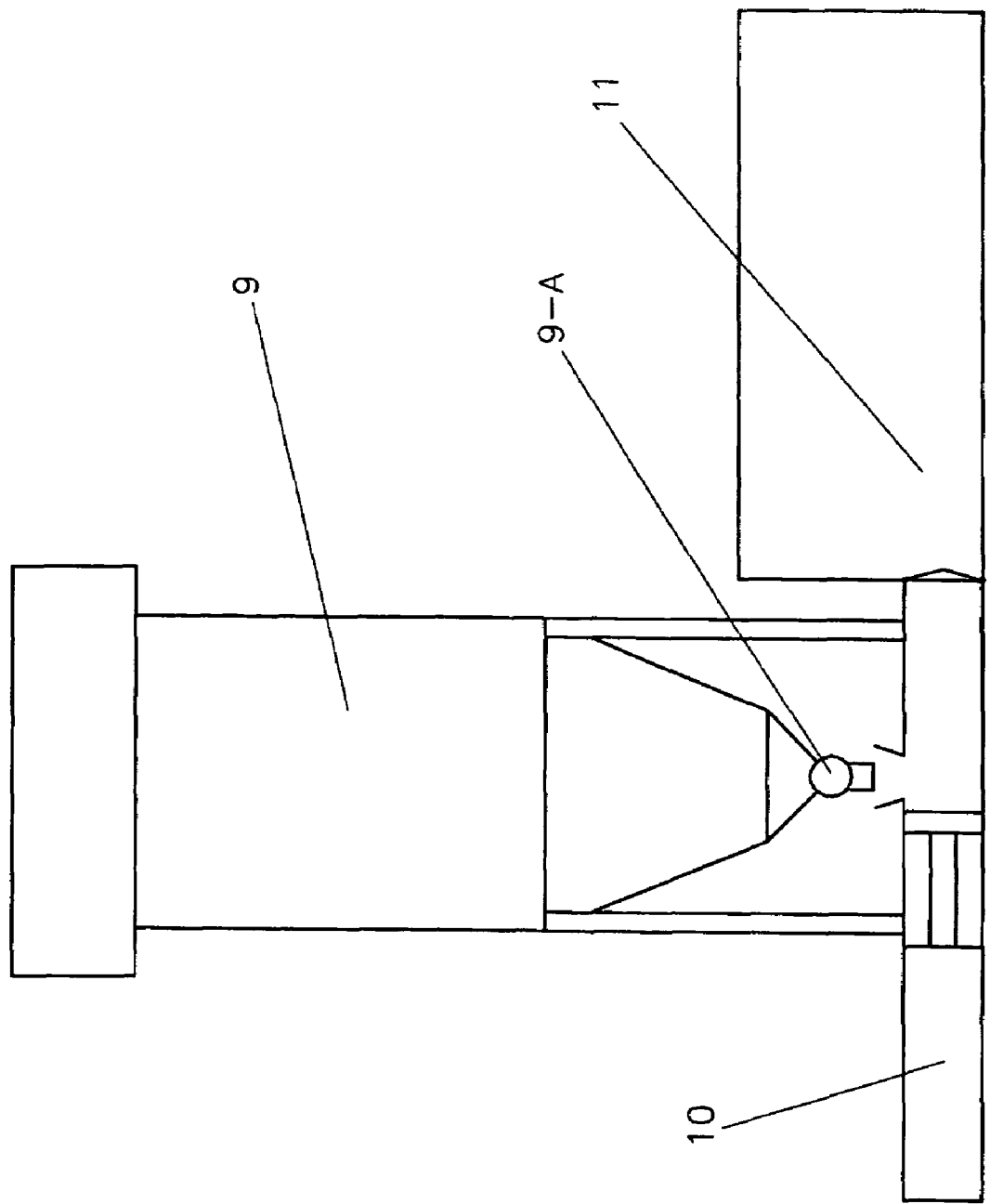
FIG. 4 shows in lateral view the third module of the device.

The invention will now be described with reference to the drawing figures, in which like reference numerals refer to like parts throughout. An embodiment in accordance with the present invention provides a device for reuse of plastic materials and paper fibers rejected in previous recycling, comprises three interlinked modules, that form a continuous production line, wherein the first module is equipped with a superior helical inclined and gyratory separator (1), which is equipped with an electric engine and a duct of material entrance (1-A) in the lower inclined edge and a duct of water entrance (1-B) in the higher inclined extremity, which (1) through the base (1-C) of its higher inclined edge, expels by motive force the denser materials through a gutter (2) to a conventional depot, while the less dense materials are discharged by hydraulic action—executed by a conventional pump (B)—through the base (1-D) of the lower inclined edge to a lower decantation tank (3) equipped with ejector nozzles (3-A), being leaded by action of said nozzles (3-A) to a inclined higher conveyor belt (4), which (4) connects the first module to a second module, that contains an electric operated mill (5) receiver of the less dense materials, and an electric operated spare mill (5-A)—substitute of the mill (5) when this one is under maintenance—, leading the aforementioned materials through a duct (5-B) in a vertical centrifugal washing machine (6) with a discharge nozzle (6-A), and leading the water and paper fibers through the nozzle (6-A) to a conventional depot, while the fragments of plastic materials pass through a duct (6-B) to a vertical centrifugal dryer machine (7) through the discharge nozzle (7-A) which complements the sending of the water and paper fibers to the conventional depot, and through a duct (7-B) which sends the already dry fragments of plastic materials to a pneumatic electric operated conveyor belt (8) interlinked through a duct (8-A) to a suspended depot (9) with a discharge valve (9-A), both parts of the third module of the device, and said valve (9-A) controls the flow of the fragments of the plastic materials to an electric compacting machine (10), which compacts said fragments inside of a conventional container (11) that is not a part of the third module of the device.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for reuse of plastic materials and paper fibers rejected in previous recycling which reuses several plastic materials and paper fibers rejected in previous recycling performed by paper industries, by compacting the fragments of the plastic materials inside of a conventional container, comprising:

three interlinked modules, comprising a first module of a helical, higher, inclined and gyratory separator, with electric engine, having the separator in the lower inclined edge a duct of materials entrance and in the higher inclined edge a duct of entrance of water, with base of its inclined higher edge leading to a gutter, and with base of the inclined lower edge leading to a lower tank of decantation provided of ejector nozzles, having a higher inclined conveyor belt that connects the first module to the second module, which contains an electric operated mill and an electric operated spare mill, with a duct connected to a vertical centrifugal washing machine equipped with a discharge nozzle and a duct connected to a vertical centrifugal drying machine equipped with a discharge nozzle and a duct linked to an electric operated pneumatic transporter, which is interlinked through a duct to a higher depot with discharge valve, part of the third module of the device, said valve connected to an electric operated compacting machine.

\* \* \* \* \*